United States Patent [19]
Wheeler

[11] 3,822,057
[45] July 2, 1974

[54] SHOT VOLUME CONTROL FOR INJECTION MOLDING MACHINE

[75] Inventor: James E. Wheeler, Roanoke, Va.

[73] Assignee: General Electric Company, Salem, Va.

[22] Filed: Nov. 1, 1971

[21] Appl. No.: 194,129

[52] U.S. Cl. .............................. 259/191, 425/145
[51] Int. Cl. .................... B28c 5/06, B28b 17/00
[58] Field of Search .............. 425/145, 147, 149; 264/328, 40, 329; 259/191

[56] References Cited
UNITED STATES PATENTS

| | | | |
|---|---|---|---|
| 2,890,491 | 6/1959 | Hendry | 264/328 |
| 3,146,287 | 8/1964 | Kleine-Alber | 264/239 |
| 3,148,231 | 9/1964 | Spencer | 425/145 X |
| 3,354,501 | 10/1967 | Bachman | 264/40 X |
| 3,409,709 | 11/1968 | Cleereman | 264/328 X |
| 3,436,443 | 4/1969 | Hutchison | 264/40 |
| 3,492,700 | 2/1970 | Kornmayer | 264/40 X |
| 3,628,901 | 12/1971 | Paulson | 425/149 |
| 3,632,246 | 1/1972 | Ichikawa | 425/135 |
| 3,642,405 | 2/1972 | Eggenberger | 425/149 |
| 3,721,512 | 3/1973 | Ma et al. | 425/149 |

Primary Examiner—J. Spencer Overholser
Assistant Examiner—John S. Brown
Attorney, Agent, or Firm—Frederick W. Powers, III; Harold H. Green, Jr.

[57] ABSTRACT

A control for an injection molding machine of the type in which a rotating screw is operative to produce a quantity of material disposed before the screw known as the "shot" and in which the shot is injected into a mold by a reciprocating action of the screw. The control includes means for sensing a deviation from a desired or appropriate volume of the shot and making necessary corrections to the machinery operation in order to insure the proper volume of the shot during the next injection.

16 Claims, 3 Drawing Figures

3,822,057

SHOT VOLUME CONTROL FOR INJECTION MOLDING MACHINE

BACKGROUND OF THE INVENTION

The present invention relates generally to controls for injection molding machines and more particularly to controls for plastic injection molding machines which automatically adjust the volume of plastic available to each operation of the machine such that there is provided the proper amount of plastic to completely fill the mold and provide the proper "cushion"; this is, the proper amount of material in excess of that required to fill the mold.

In the past, injection molding machines were controlled by manual adjustment. During the initial setup, adjustments were made to the several control variables on a trial and error basis until such time as a proper part was obtained. Subsequent operations required constant operator attention to assure that the various parameters affecting the molding process as a whole did not vary to such an extent as to seriously affect the quality of the molded parts. As such, it is readily seen that the initial setup and constant attention required not only a large amount of time but also that the quality of parts was highly dependent upon the skill of the individual machine operator. With the increasing use of injection molded plastics and the ever increasing types of plastics utilized, as well as a proliferation in the types of machines, it is increasingly difficult as well as expensive to obtain skilled operators for plastic injection molding.

It is, therefore, an object of the invention to provide an improved control for an injection molding machine.

It is a further object to provide a control for permitting an operator to make initial setup adjustments of the machine and, by subsequently sensing errors, to automatically adjust the various operating components of the machine to produce properly molded parts.

It is a still further object to provide a control for a plastic molding machine which automatically senses the amount of error in the volume of the shot in a plastic molding machine of the screw type and adjusts the machine in accordance with the amount of error sensed.

SUMMARY OF THE INVENTION

Briefly stated, the present invention provides a control for an injection molding machine in which there is generated an error correction signal upon each operation of the machine which signal is utilized to adjust the machine for subsequent operations. Primarily, two means of sensing may be used; one being pressure and the second being velocity of the screw as it is reciprocated to form the injection mold. In either case the signal is utilized to adjust the position of the screw for the next application such that a larger or smaller shot is effected.

DESCRIPTION OF THE DRAWINGS

Further objects and advantages of the present invention will become apparent as the following description proceeds and the features of novelty which characterize the invention will be pointed out in particularity in the claims annexed to and forming a part of this specification. For a better understanding of the present invention, reference is made to the accompanying drawings in which;

DETAILED DESCRIPTION

Figure 1:
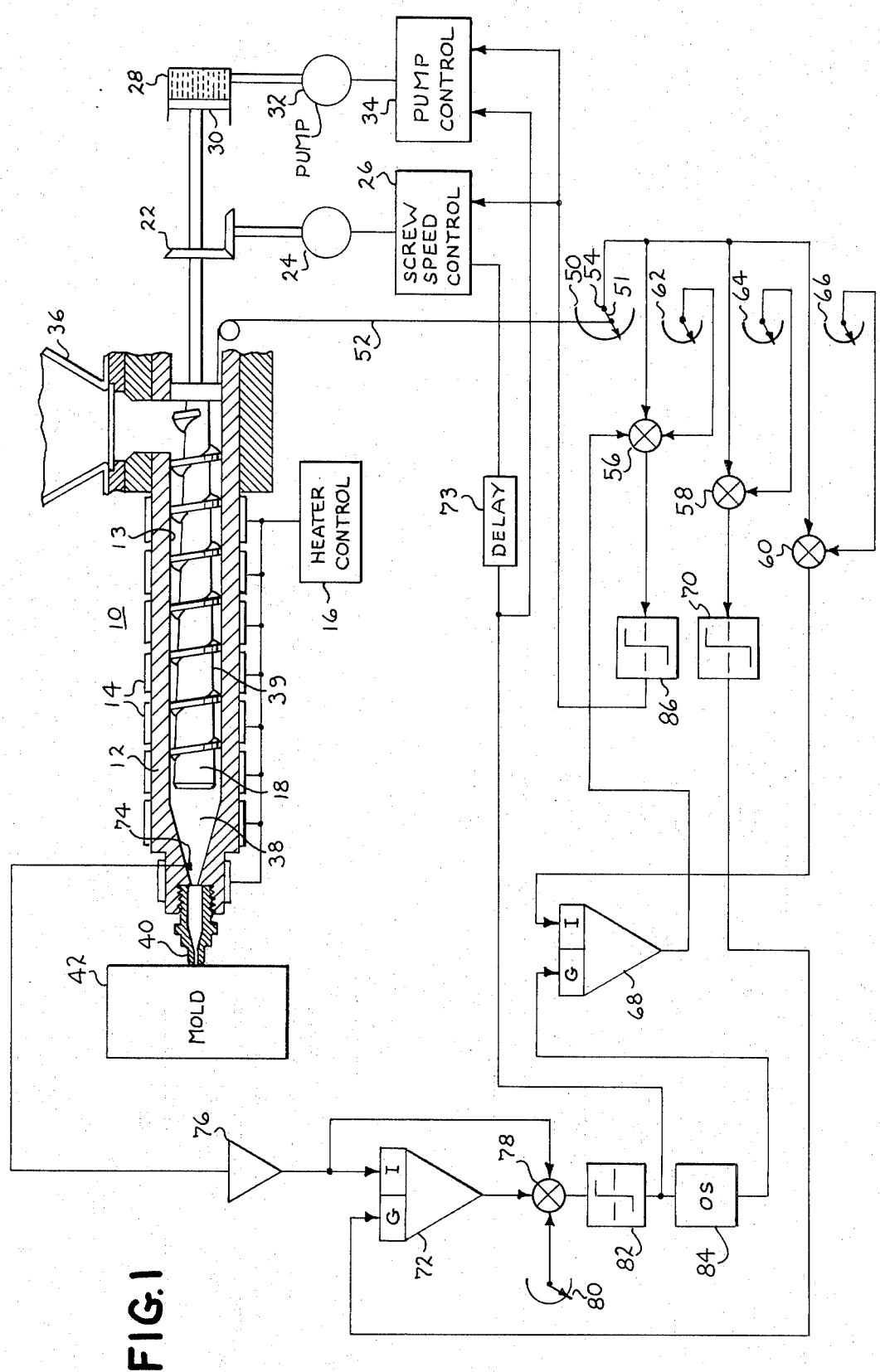
FIG. 1 is a schematic view of a typical plastic injection molding machine in an operational relationship with the control of the present invention.

Referring now to FIG. 1 there is shown an injection molding machine indicated generally at 10 which includes a barrel 12 having a centrally extending bore 13. A nozzle 40, containing a suitable valve machanism (not shown) is located at the end of the barrel 12. The barrel 12 is surrounded by a plurality of heating elements 14 under the control of a suitable control 16. The heaters 14 are normally of the electrical resistance type and are primarily the purpose of maintaining the barrel 12 at a constant temperature to help assure the proper temperature of the plastic therewithin. The heaters 14 are connected to a suitable power source which has not been shown through the heater control 16. Disposed within the bore 13 of the barrel 12 is a rotating screw 18 which is connected via suitable means such as a shaft 20 and gearing 22 to a motor 24 whereby the screw may be rotated along its longitudinal axis. The motor 24 is energized from a suitable source (not shown) by way of a screw speed control means 26, all in a manner well known in the art. (It is, of course, to be realized that the actual method of giving rotary motion to the screw 18 is shown here in the simplified form for explanatory purposes.) As well as being adapted for reciprocal motion, the screw 18 is designed for reciprocal motion along its longitudinal axis. The means by which this motion is achieved is simply illustrated as a hydraulic system including a cylinder 28 within which is disposed a piston 30. The amount of fluid within the cylinder 28 and the pressure of the fluid is a function of a pump 32 under the control of a suitable pump control means 34. As was the case in the previous instances, the pump power source has been omitted for the sake of simplicity.

A hopper 36 is disposed at the right hand or rear portion of the screw machine for the introduction of plastic material, usually in the form of pellets, into the barrel. From the hopper end of the machine, the plastic is fed to the forward end of the barrel by the auger action of the rotating screw. As is customary in the art, the design of the screw 18 is such that it includes a spiral flute 39 the depth of which decreases from the hopper end of the screw toward the front or nozzle end. In operation, it is this construction which converts the plastic material in pellet form into a liquid form or, as it is more commonly known, the melt. The rotation of the screw as it feeds the plastic material toward the nozzle end of the machine creates shearing and compression forces which heat the plastic material and thus cause it to melt.

To the left of the screw, within the bore of the barrel, is a region 38 known as the shot volume region. In FIG. 1 the screw is shown in its most forward position.

Under the rotational action of the screw, plastic is fed into the region 38. As more and more material is forced into this region the increasing resulting pressure on the face of the screw forces the screw back (to the right as illustrated in FIG. 1). When the screw reaches a prescribed position the rotational action of the screw is halted and the difference in volume of region 38 between the most forward or terminating position of the screw 18 and its most rearward or starting position is the amount of plastic available for injection in a mold 42 located adjacent to the nozzle 40. This displacement or volume is known as the "shot" or the "shot volume." When the proper shot has been achieved and the screw rotation stopped the screw, now acting as a piston, is given a forward linear motion through the actuation of the hydraulic system including the piston 30 and the cylinder 28. It is this linear motion which injects the molten plastic into the mold.

The amount of material left within the bore 13 after the screw has been fully moved to the left to force plastic into the mold is called the cushion. If the cushion is too small, the mold may not fill completely. If the cushion is too large there exists the danger of too great a pressure upon the plastic within the mold or a partial solidification of the cushion which would affect the quality of subsequently molded parts. It is, therefore, highly desirable that the proper "cushion" be maintained and to this end the present invention is directed.

Before beginning a detailed description of the control portion of FIG. 1 an explanation of the method of presentation is believed desirable. All paths shown are signal paths to transmit either an analog or digital signal in accordance with the description that follows. In addition, it is noted that several potentiometers are illustrated and while no power connections are shown to these potentiometers they are to be considered as connected to a suitable source of power all in the manner well known in the art. While potentiometers are shown, it is to be realized that these are devices designed to provide signals of varying magnitude or quantity in accordance with their instantaneous settings and as such they are to be considered as representative of a suitable device capable of similar function. For convenience sake, all signals will be termed as either positive or negative signals with the expressed understanding that this is an arbitrary designation and that the relative polarities could be reversed, the signals could be of different specified values with respect to an arbitrary zero or the system could be implemented utilizing digital rather than analog signals.

Referring once again to FIG. 1 the control circuitry includes a position potentiometer 50 having a wiper 51 which is connected by a suitable mechanical means illustrated as a cable 52 to the screw 18 such that the position of the potentiometer wiper is moved in accordance with the longitudinal position of the screw 18. As such there is provided at the wiper terminal 54 a negative signal, the magnitude of which is proportional to the position of the screw within the bore of the barrel 12. The position signal from terminal 54 forms an input to each of three summing junctions 56, 58 and 60. Each of these summing junctions has a second input respectively from three potentiometers 62, 64 and 66. The potentiometers 62, 64 and 66 are manually adjustable in accordance with the subsequent description and provide positive signals to their respective summing junctions.

Consider first the lower most potentiometer 66. This potentiometer is referred to as the "desired cushion" potentiometer and it is manually adjusted to a position corresponding to that which, in the experience of the operator or in accordance with established procedure, is believed to be desired cushion for the particular operation to be performed. Potentiometer 66 supplies a positive signal to its summing junction 60 such that when the magnitude of the position signal 54 equals that from the potentiometer 66 the value of the output of the summing junction 60 would be zero. In any other position the output of summing junction 60 is of some finite value either positive or negative and this signal is applied as an input to an I terminal of an integrating read and hold circuit 68. The integrating read and hold circuit 68 is of a known type and constitutes essentially an amplifier having a capacitor in parallel therewith. As such, the circuit will continue to integrate the signal applied to its I terminal until such time as a second or gating signal is applied to a second G terminal. When the gating signal is applied the output of the amplifier is held constant until the gate is removed at which time integration again commences.

Potentiometer 64 is termed the "injection set point" potentiometer and serves to provide a positive signal to the summing junction 58 in opposition to the position signal from potentiometer 50. As was the case with potentiometer 66, potentiometer 64 is manually adjustable and is positioned during the setup time on the machine to a position corresponding to where experience has indicated will be the proper point to begin ejection into the mold. The output of the summing junction 58 forms an input to a binary switch 70 of the type well known in the art. Binary switches such as switch 70 provide an output of either of two levels. That is, when its input signal is below a certain value it will have an output of a predetermined magnitude in the negative direction. When the input signal to a binary switch is above the predetermined level the output of the switch will have a predetermined magnitude in the positive direction. The output of the binary switch 70 forms an input to a gate terminal of a read and hold circuit 72.

Read and hold circuit 72 is of the type standard within the art and is, essentially, a gated amplifier whose output directly follows the value of an input to an I terminal until such time as there is a gating signal applied to the G terminal thereof. With a gating signal applied to the G terminal, the output of the read and hold circuit will maintain a constant value for so long as the gating signal is present. In the presently illustrated embodiment, a positive signal derived from a suitable pressure sensitive transducer such as a strain gage located within the cushion region 38 of the barrel 12 is the source of the signal applied to the I terminal of the read and hold circuit 72. It is to be understood that any suitable means for providing this signal could be employed and that inasmuch as this is a hydraulic system and therefore substantially constant pressure from a fluid standpoint, the pressure gage could equally well be located within the cylinder 28.

Figure 2:
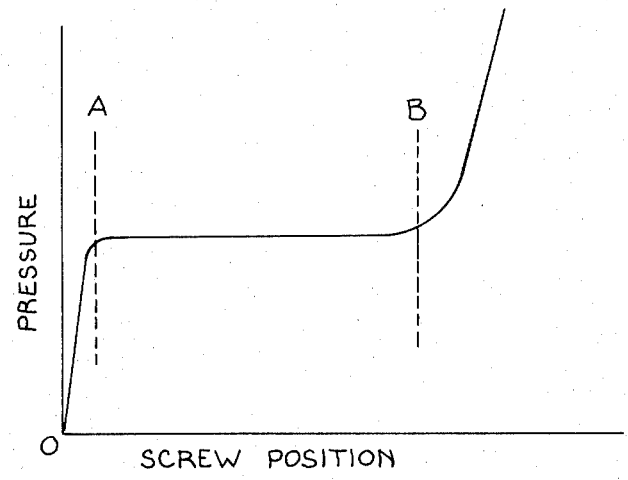
FIG. 2 is a graph showing the typical relationship between the position of the screw of the machine shown in FIG. 1 as compared to the pressure existing at the nozzle end of the screw; and, FIG. 3 is a graph showing the relationship between the position of the screw of the machine shown in FIG. 1 as compared to the velocity of the screw in its reciprocating motion.

Before continuing with the description of FIG. 1, reference is directed to FIG. 2 which shows a graph of the pressure within the region 38 with respect to the position of the screw 18. Plastic, in its molten form is a relatively non-compressible fluid. Starting at the graph origin, it is seen that as the screw begins its ramming action to initiate the injection process there is a rapid build up of pressure, points 0 to A on the graph. At point A the system pressure is sufficient to overcome the internal friction of the plastic and the plastic will begin to flow into the mold. The line between points A and B on the graph, during which period the pressure remains substantially constant, represents that time during which the mold cavity is being filled. At point B the mold cavity has filled and it is seen that with continued motion of the screw there will be a rapid build-up of pressure within the system. The slope of the curve to the right of point B is in part a function of the cushion volume previously described.

Returning to the description of FIG. 1, the signal from the strain gage 74 is amplified, if necessary, to suitable levels by means of an amplifier 76 the output of which forms the I input to the read and hold circuit 72. The signal from the amplifier 76 also comprises one input to a three input summing junction 78. A second input to the summing junction 78 is from the read and hold circuit 72 while the third input is from a deadband potentiometer 80 which functions to provide sufficient bias to the summing junction 78 to override or damp out minor fluctuations and electrical noise within the system. Within the terms of reference of the present embodiment, the output from the amplifier 76 is positive while that from the read and hold circuit 72 which performs an inverting function, is negative. The output from the deadband potentiometer 80 is negative.

Summing junction 78 forms an input to a binary switch 82 such that when the output of the junction 78 exceeds a predetermined value, the switch 82 will change from the negative to the positive state.

Binary switch 82 forms an input to the pump control 34, such that when the binary switch 82 goes positive indicating that the injection process is complete the pump 32 will turn off and hence stop the longitudinal or ramming motion of the screw 18. This same signal may be utilized to initiate the screw rotation for the next molding. In FIG. 1, this function is illustrated by the application of the signal from switch 82 to the screw speed control 26 by way of a delay means 73. The delay means 73 symbolically represents the time required for permitting the newly formed part to solidify, and to perform such other functions, not directly pertinent to the present invention, to be performed. The output of the binary switch 82 also forms an input to a monostable multivibrator or one shot 84 which in response to a positive signal from switch 82 will maintain an output signal of predetermined magnitude for a predetermined length of time. In the present instance, this duration is approximately 30 milliseconds. The output of one shot 84 forms the gate signal to the G terminal of the integrating read and hold circuit 68.

The output value of integrating read and hold circuit 68 represents the incremental amount which the screw must be adjusted in returning to its return position for the next subsequent shot. This signal is applied as an input either positive or negative to a summing junction 56. As was previously discussed, the position potentiometer 50 provides a position signal to the summing junction 56 which is negative in polarity. Potentiometer 62 which may be termed the return to position setpoint potentiometer applies a negative input. Potentiometer 62 as were potentiometers 64 and 66 is manually adjustable and is normally positioned at the machine set up time to that position which experience has indicated will be approximately the proper return position for the screw. The output of summing junction 56 is applied to a third binary switch 86 the output of which is applied to the screw speed control 26 and serves to turn the motor off when the switch output goes negative. This signal, signifying that the shot is formed may also be utilized to initiate the action of the pump 32 to effect the linear motion of the screw and to open the valve in the nozzle 40.

A typical operation of cycle of the control is as follows. For purposes of this illustration it will be assumed that the hopper 36 has been filled with plastic material and that the other heating controls have been actuated as well as those controls which will maintain the proper melt temperature. It will also be assumed that the operator has adjusted the three potentiometers 62, 64 and 66 to values which experience has indicated are approximate to that which is desired. At this time the output from the integrating read and hold circuit 68, which is the amount of deviation necessary to the return position, is zero. Upon initiation of the cycle the screw 18 under the control of the screw speed control 26 is started to rotate to feed the plastic material to the left along the screw and convert the material into the liquid form as previously described. At the beginning of the cycle the screw is positioned toward the left as illustrated in FIG. 1. As more and more material is deposited by the screw into the region 38 (nozzle 40 being closed) the pressure on the left side of the screw forces the screw toward the right with a resultant change in the value of the output of the position potentiometer 50. Inasmuch as the output of the circuit 68 is zero the summing junction 56 has only two effective input signals. Thus, when the absolute magnitudes of the potentiometer 50 and the potentiometer 62 are equal the output of the summing junction will cause the binary switch 86 to change its polarity or state and this output is then applied to the screw speed control 26 to stop the rotation of the screw. The actual shot is now formed; that is, the full amount of material to be used in the injection process is located within the region 38 and the plastic is ready to be injected into the mold. At this time, or immediately preceding this time, various functions such as clamping the mold have been accomplished. With the completion of all such functions and the stopping of screw rotation there is applied to pump control 34, by means not a part of the present invention, a signal which initiates the pump to begin the injection portion of the cycle. That is, the pump 32 is actuated increasing the pressure within the cylinder 28 and hence forcing the screw, now acting as a piston, towards the left as shown in FIG. 1. With the initiation of the injection cycle the valve within the nozzle 40 is opened and molten plastic material is forced into the mold 42. As the screw moves towards the left, the value of the potentiometer 50 will vary and when the value of the signal from potentiometer 50 equals that from the potentiometer 64, binary switch 70 will change state to supply a gating signal to the G terminal of the read and hold circuit 72. The read and hold circuit 72 output has been following the value of the signal from the pressure transducer 74 and upon the application of the signal to its gate its output signal value is maintained constant. With the output value of the read and hold circuit 72 fixed, continued movement of the screw to the left will continue to increase the value of the output of amplifier 76 such that when its value (positive) is greater than the retained value within the read and hold circuit 72 by an amount equal to the setting of the deadband potentiometer 80 there will be issued from the summing junction 78 a signal which causes the binary switch 82 to change its state. The change of state signal from the binary switch 82 is applied to the pump control 34 to either stop the pump 32 and hence halt the injection process or to maintain it at a lower more controlled pressure rise in accordance with the design of the particular machine involved.

The output from the binary switch 82 also forms an input to the one shot 84 which emits a gating pulse to the G terminal of the integrating read and hold circuit 68 for a predetermined length of time. It will be remembered that the other input to the integrating read and hold circuit 68 was from the summing junction 60 which will in effect have an output which is proportional to the difference between the actual screw position as indicated by the value of the signal from the potentiometer 50 and the desired screw position as set by the potentiometer 66. Thus, the signal from the integrating read and hold circuit 68 may be considered an error correction signal between the desired cushion and the actual cushion. If during subsequent machine cycles no further correction is necessary, the output of the circuit 68 will remain a constant value. The length of time during which this sample was taken is variable in accordance with the setting of the one shot 84, therefore, because of the integration function of circuit 68 this variable pulse length may be considered as a gain adjustment.

The injection process is now completed and after completion various machine cycle function such as the ejection of the molded part from the mold, etc., the screw is once again caused to commence rotating and the process is repeated. It should, however, be recognized, in this instance and in all subsequent actions, that the summing junction 56 has three effective inputs. As before there exists the actual position signal (potentiometer 50) and the initial set point signal from the potentiometer 62 but there is also now included a value or error signal from the integrating read and hold circuit 68.

Figure 3:
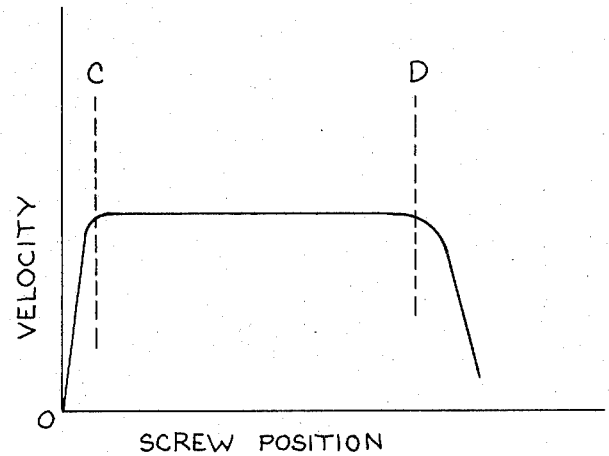

The description to this point has been with respect to sensing pressure within the hydraulic portion of the machine. One modification to that shown and described thus far may best be understood with reference to FIG. 3. In FIG. 3 there is shown a graph relating screw position to longitudinal screw velocity. Referencing FIG. 3 it is seen that at the start of the injection cycle the screw, acting under the influence of the hydraulic system, has its velocity increase very rapidly to a point indicated at C representing the time at which the plastic begins injection into the mold. The actual injection period is represented on the graph between points C and D. When the mold has been filled, the velocity of the screw will rapidly decrease to zero in that the screw can no longer be moved because of the pressure of the plastic within the mold and the cushion within the region 38. The similarity between the two graphs in FIG. 2 and FIG. 3 is believed apparent. As for actual implementation, a suitable tachometer which would measure the linear velocity of movement of the screw along its longitudinal axis could be employed. The output of such a tachometer would be applied to the amplifier 76 (appropriately compensated for values) to achieve the functions previously described. It is also readily apparent that although the system has been described with respect to an analog system it could be implemented in a digital form or a combination analog/digital system could be implemented. In this case, the conversion of analog signals to digital signals, the substitution of counters for the read and hold circuit 72 and the integrating read and hold circuit 68 and the implementation of suitable digital outputs for the various potentiometers are believed within the skill of the art.

Where there have been shown and subscribed what are at present considered to be the preferred embodiments of this invention, modifications thereto will readily occur to those skilled in the art. The substitution of the velocity measurement for the pressure measurement and the substitution of digital for analog are two such modifications. It is not desired, therefore, that the invention be limited to the specific embodiment shown and subscribed and it is intended to cover in the appended claims all such modifications as fall within the true spirit and scope of the invention.

What is claimed is:

1. A control for use with an injection molding machine of the type in which molten material is injected into a mold under the force of a moving piston acting within a barrel, comprising:
   a. means to move the piston within the barrel through a variable distance defined by a starting position and a terminating position;
   b. first sensing means for sensing a system variable associated with the action of the piston and for outputting a signal representative thereof;
   c. means coupled to said first sensing means for establishing said terminating position in response to the sensed status of the system variable;
   d. second sensing means for monitoring the position of the piston and outputting a signal representative thereof; and,
   e. means coupled to said first and said second sensing means for adjusting the location of said starting position with respect to said terminating position in response to the signals outputted by said first and said second sensing means.

2. The invention in accordance with claim 1 wherein the sensing means senses the fluid pressure associated with the molten material under the action of the moving piston.

3. The invention in accordance with claim 1 wherein the first sensing means senses the fluid pressure of the molten material within the barrel.

4. The invention in accordance with claim 1 wherein the first sensing means senses the velocity of the moving piston.

5. The invention in accordance with claim 1 wherein said first sensing means senses a change in the system variable to effect the adjustment of the location of said starting position.

6. The invention in accordance with claim 5 wherein the change sensed by said first sensing means is a change in the fluid pressure associated with the molten material under the action of the moving piston.

7. The invention in accordance with claim 5 wherein the change sensed by said first sensing means is a change in the fluid pressure of the molten material within the barrel.

8. The invention in accordance with claim 5 wherein the change sensed by said first sensing means is a change in the velocity of the moving piston.

9. A control for use with an injection molding machine of the type in which molten material is injected into a mold under the force of a moving piston acting within a barrel comprising:
   a. means to move said piston within said barrel through a variable distance extending between a starting position and a terminating position;
   b. means to establish said terminating position including first sensing means operative to generate a signal in response to a system variable associated with the action of said piston;
   c. second sensing means operative to generate a signal representative of the position of the piston;
   d. adjusting means operative to adjust the location of said starting position relative to said terminating position; and,
   e. means coupled to said adjusting means and responsive to said first and second signals to generate an error correction signal for operating said adjusting means.

10. The invention in accordance with claim 9 wherein the first sensing means senses the fluid pressure associated with the molten material under the action of the moving piston.

11. The invention in accordance with claim 9 wherein the first sensing means senses the fluid pressure of the molten material within the barrel.

12. The invention in accordance with claim 9 wherein the first sensing means senses the velocity of the moving piston.

13. A control system for a plastic injection molding machine of the type having a screw operable within a barrel in a first mode for rotary motion to feed plastic material to a chamber located in front of the screw and in a second mode for linear motion whereby said screw serves as a piston to inject molten plastic into a mold, said control system comprising:
   a. first drive means operative to effect the rotary motion of said screw;
   b. second drive means operative to effect the linear motion of said screw;
   c. means for generating a position signal proportional to the linear position of the screw within said barrel;
   d. means to generate an injection set point signal at a predetermined time with respect to the linear position of the screw;
   e. means responsive to said injection set point to sense a change in a prescribed variable associated with the linear motion of said screw and to produce a change signal representative of said change, said change signal serving to render said first drive means active and said second drive means inactive;
   f. correction means to compare said position signal with a predetermined reference signal and to produce an error correction signal in response to said change signal; and,
   g. means responsive to the algebraic sum of said error correction signal, said position signal, and a signal representing a desired position of the screw within the barrel to produce a control signal for rendering said first drive means inactive and said second drive means active.

14. The invention in accordance with claim 13 wherein said correction means includes means to integrate the algebraic sum of the position signal and the predetermined reference signal to produce the error correction signal.

15. The invention in accordance with claim 13 wherein the change signal results from a change in the fluid pressure associated with the molten material within the chamber.

16. The invention in accordance with claim 13 wherein the change signal results from a change in velocity of the screw when operating in said second mode.

* * * * *